United States Patent
Wagner et al.

(10) Patent No.: US 10,099,582 B2
(45) Date of Patent: Oct. 16, 2018

(54) PIVOTAL HEAD RESTRAINT WITH ADJUSTABLE SIDE WINGS

(71) Applicant: FORD GLOBAL TECHNOLOGIES, LLC, Dearborn, MI (US)

(72) Inventors: Uwe Wagner, Wermelskirchen (DE); Carsten Schauf, Leichlingen (DE); Daniel Hari, Cologne (DE); Andrew John Murray, Colchester (GB); Killian Vas, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 14/635,401

(22) Filed: Mar. 2, 2015

(65) Prior Publication Data

US 2015/0266403 A1    Sep. 24, 2015

(30) Foreign Application Priority Data

Mar. 24, 2014    (DE) .................. 10 2014 205 456

(51) Int. Cl.
*B60N 2/48*    (2006.01)
*B60N 2/844*    (2018.01)
(Continued)

(52) U.S. Cl.
CPC .......... *B60N 2/4882* (2013.01); *B60N 2/844* (2018.02); *B60N 2/847* (2018.02); *B60N 2/859* (2018.02); *B60N 2/885* (2018.02)

(58) Field of Classification Search
CPC .. B60N 2/4882; B60N 2/4844; B60N 2/4847; B60N 2/4855; B60N 2/4858; B60N 2/487; B60N 2/4873
See application file for complete search history.

(56) References Cited

U.S. PATENT DOCUMENTS

| | | | | |
|---|---|---|---|---|
| 5,681,079 | A | * | 10/1997 | Robinson ............. B60N 2/3013 297/378.12 |
| 6,648,416 | B2 | * | 11/2003 | O'Connor ............. A47C 7/383 297/397 |

(Continued)

FOREIGN PATENT DOCUMENTS

| | | |
|---|---|---|
| DE | 19851027 A1 | 5/2000 |
| EP | 0152867 A2 | 8/1985 |

(Continued)

OTHER PUBLICATIONS

English translation for DE19851027A1.
(Continued)

*Primary Examiner* — David R Dunn
*Assistant Examiner* — Tania Abraham
(74) *Attorney, Agent, or Firm* — Vichit Chea; King & Schickli, PLLC

(57) ABSTRACT

A head restraint includes a central part, a fastener for fastening the central part to a backrest of a vehicle seat, and at least one side wing. The side wing is mounted pivotably in relation to the central part between the neutral position and at least one comfort position, and is fixable at least in the comfort position. The fastener is designed to mount the central part pivotably relative to the backrest about a horizontal pivot axis. The central part is pivotable between a parking position and at least one supporting position and is fixable at least in the supporting position.

11 Claims, 4 Drawing Sheets

(51) Int. Cl.
    *B60N 2/885*     (2018.01)
    *B60N 2/859*     (2018.01)
    *B60N 2/847*     (2018.01)

(56) References Cited

U.S. PATENT DOCUMENTS

| | | | | |
|---|---|---|---|---|
| 7,201,448 | B2 * | 4/2007 | Williamson | B60N 2/01508 297/407 |
| 7,364,239 | B2 * | 4/2008 | Clough | A47C 7/38 297/391 |
| 8,449,036 | B2 * | 5/2013 | Jeong | B60N 2/4808 297/408 |
| 2005/0052065 | A1 * | 3/2005 | Rothstein | B60N 2/3011 297/403 |
| 2005/0121963 | A1 | 6/2005 | Williamson et al. | |
| 2009/0302660 | A1 * | 12/2009 | Karlberg | B60N 2/4882 297/404 |
| 2010/0141008 | A1 * | 6/2010 | Augade | B60N 2/4882 297/408 |

FOREIGN PATENT DOCUMENTS

| | | | | |
|---|---|---|---|---|
| EP | 1492702 | B1 | 8/2005 | |
| EP | 2116150 | A1 | 11/2009 | |
| JP | 2006069287 | A * | 3/2006 | B60N 2/4882 |

OTHER PUBLICATIONS

English Machine Translation of EP0152867A2.
English Machine Translation of EP1492702A1.
English Machine Translation of EP2116150A1.

* cited by examiner

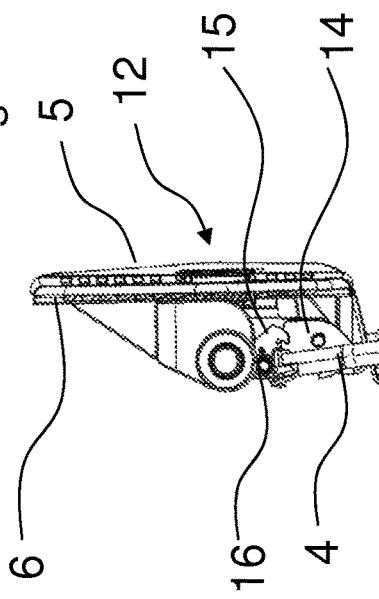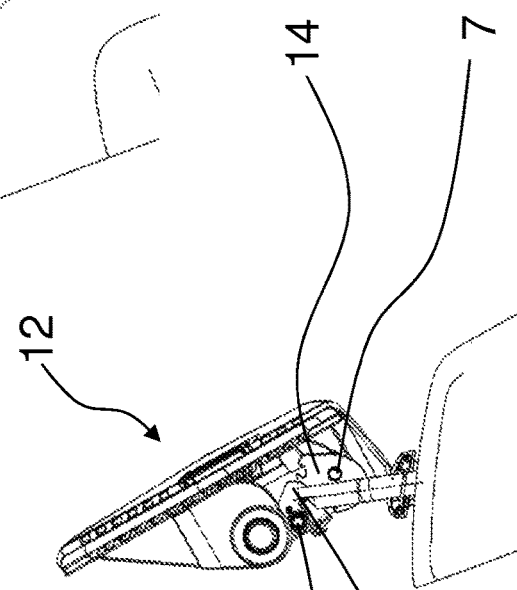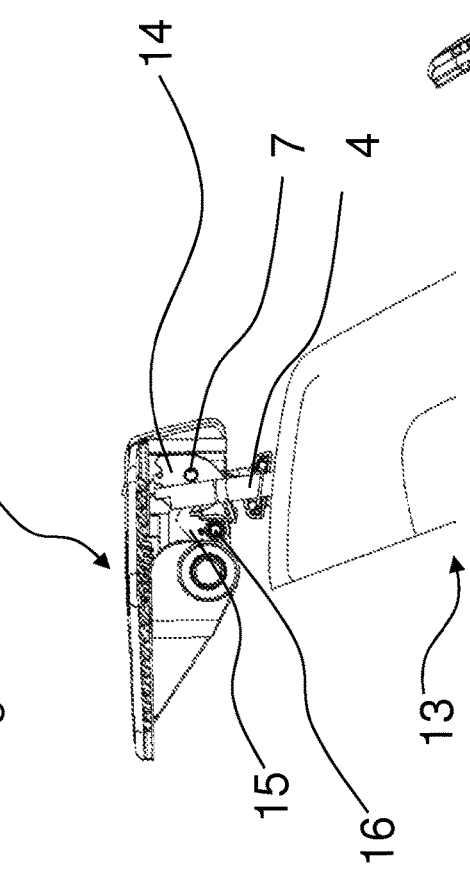

PIVOTAL HEAD RESTRAINT WITH ADJUSTABLE SIDE WINGS

TECHNICAL FIELD

The present invention relates to a head restraint for fastening to a backrest of a vehicle seat and to a vehicle seat with a head restraint.

BACKGROUND

In the case of known head restraints for vehicle seats, functionality, comfort and overall size compete with one another. Firstly, the head restraint is intended to be able to provide a user with good head adjustment with a protective function against external dynamic effects, and, secondly, the driver's view is intended not to be unnecessarily restricted by the head restraints of unoccupied seats. Head restraints with side elements for improving the head adjustment, which head restraints are also concerned with the problem of view optimization, are already known from the prior art.

DE 198 51 027 A1 discloses a head restraint for vehicle seats with a central head cushion part and two pivotable elements arranged laterally thereon. When not in use, in order to optimize the driver's view, the lateral elements can be pivoted into the contour of the central head cushion part in a space-saving manner, and therefore the view is not inhibited any more than in the case of a head restraint without side elements.

Against this background, the present invention is based on the object of providing a head restraint for fastening to a back rest of a vehicle seat, in particular a car seat, which head restraint provides good head adjustment and is configured in such a manner that, when not in use, the restriction of a driver's view can be minimized. Furthermore, a vehicle seat with a corresponding head restraint is intended to be provided, the vehicle seat also profiting from an optimized overall size.

This object is achieved by a head restraint with the features of claim 1 and by a vehicle seat as claimed in claim 9. Further advantages and features of the invention emerge from the dependent claims.

SUMMARY

It should be emphasized that the features specified individually in the claims can be combined with one another in any technically expedient manner and depict further refinements of the head restraint. The description characterizes and specifies the head restraint, in particular additionally in conjunction with the figures.

A head restraint comprises a central part, a fastener and at least one side wing. The fastener is designed to fasten the central part to a backrest of a vehicle seat. The central part and the side wing are preferably padded. For example, the central part and the at least one side wing each comprise a baseplate, the baseplates being arranged on each other by means of a respective edge side and enclosing an angle with each other. In particular, the baseplate of the central part is designed in such a manner that one edge side extends parallel to the upper side of the backrest, and the side wing is arranged on an edge side adjacent thereto. In one refinement, paddings are arranged on the baseplates.

According to one possible embodiment, the at least one side wing is mounted pivotably in relation to the central part between a neutral position and at least one comfort position and is fixable at least in the one comfort position. In particular, in the neutral position, the side wing is arranged on the central part in such a manner that the head restraint has the flattest possible configuration thereof. For example, in the neutral position, a baseplate of the central part and a baseplate of the side wing enclose an angle of 180° with each other, as a result of which a flat configuration of the head restraint can be brought about.

In the at least one comfort position, the side wing is pivoted out of the neutral position thereof in relation to the central part. In particular, the side wing is fixable in a plurality of comfort positions. By means of the side wing angled from the central part, a user can comfortably lean his head thereagainst, and the side wing can also provide protection against a lateral dynamic effect. For example, in the comfort position, the side wing encloses an angle of between 170° and 90° with the central part.

According to one possible embodiment, the fastener is designed to mount the central part pivotably relative to the backrest about a horizontal pivot axis between at least one supporting position and a parking position. For example, the central part is pivotable about the horizontal pivot axis within an angular range of 180°. In particular, the central part is pivotable about the horizontal pivot axis within an angular range of 110°. Furthermore, the central part is fixable in the at least one supporting position. In a first supporting position, the central part preferably essentially forms an extension of the backrest. Particularly preferably, the central part is fixable in further supporting positions by being pivoted in the direction of the front or of the rear of the vehicle.

The supporting position and the parking position are defined, for example, by the angle enclosed by the central part with a perpendicular. Particularly preferably, the head restraint is pivotable in the direction of the rear of a vehicle.

The parking position within the context of this embodiment does not mean that the head restraint is in this position preferably in a parking vehicle. On the contrary, this indicates the position in which the head restraint can preferably be located when the head restraint is not in use by a user. In particular, the head restraint has the lowest vertical extent in the parking position, and therefore the driver's view is the least impaired. In the parking position, the central part is particularly preferably oriented substantially parallel to the seat surface of the vehicle seat. For example, in the parking position, the central part encloses an angle of 90° with the perpendicular.

According to an advantageous refinement, the head restraint comprises two side wings which are arranged on the central part and, in the parking position of the central part, protrude diametrically from the central part, as a result of which a flat configuration of the head restraint is realizable. For example, the central part and the side wings in each case comprise a substantially four-cornered baseplate, and the baseplates of the side wings are arranged on opposite edge sides of the four-cornered baseplate of the central part. If the side wings extend diametrically away from the central part, the baseplate of the central part encloses an angle of 180° with each of the two baseplates of the side wings, which corresponds to the preferred neutral position of the side wings. The two side wings can be fixed, in particular independently of each other, in different comfort positions. A user can therefore adjust the head restraint individually according to his requirements.

The side wings are preferably pivotable about two pivot axes which are arranged mirror-symmetrically with respect to each other. For example, the two pivot axes run parallel to each other. According to a further refinement, the mirror axis extends perpendicularly to the horizontal pivot axis of the central part. In particular, the central part is also formed mirror-symmetrically.

In the preferred first supporting position, the imaginary extensions of the two mirror-symmetrical pivot axes particularly preferably intersect at a point below the horizontal pivot axis about which the central part is pivotably mounted. The imaginary intersecting point of the mirror-symmetrical pivot axes particularly preferably lies at a distance from the head restraint, said distance corresponding approximately to the length of the backrest of the vehicle seat. For example, the central part comprises a baseplate in the form of a symmetrical trapezoid, and the mirror-symmetrical pivot axes of the side wings extend along the non-parallel edge sides of the trapezoid.

According to an advantageous refinement, the fastener comprises means for adjusting the height of the head restraint. As a result, said head restraint can be adjusted specifically to the user and therefore an improved head adjustment and optimized protection can thus be ensured.

In yet another embodiment, the fastener has at least one rotatably mounted ratchet wheel with a toothing, and an associated pawl for the releasable fixing of the central part. The pawl is mounted movably and is pressed, for example, by gravity or in an elastically prestressed manner, onto the toothing of the ratchet wheel. An unintentional folding down of the head restraint is prevented by the pawl engaging in the ratchet wheel.

The fastener preferably furthermore comprises a release element for releasing the pawl from the engagement with the associated ratchet wheel. For example, the pawl is pressed onto the ratchet wheel by spring force, and the release element comprises a push button which, when actuated, acts on the spring in such a manner that the pawl is released.

In accordance with an additional aspect, a vehicle seat is provided with a backrest and a head restraint as just described. By means of the above-described possibility of transferring the head restraint into a flat configuration, an improved overall size of the vehicle seat can also be achieved. In particular in the parking position of the head restraint, the vehicle seat is presented in an overall more compact configuration since the head restraint has the smallest vertical extent with respect to the vehicle seat in the parking position.

The backrest of the vehicle seat can preferably be folded down. For example, the vehicle seats of a car, the backrest of which vehicle seats can be folded down, for example, for increasing the trunk space or for entry into the rear, are involved. If the head restraint of the vehicle seat is in the parking position, then, in order to fold the vehicle seat down, less space is required in the interior of the car than with the vehicle seat with the head restraint in the supporting position. Even for front seats which can be folded down, such a configuration is advantageous in respect of the view and the overall size for the reasons mentioned above.

Further advantages and features of the head restraint and vehicle seat emerge from the description below of an exemplary embodiment, not to be understood as limiting, which is explained in more detail below with reference to the figures. In particular, the various position options of a central part and of side wings of a head restraint are intended to be clarified with reference to the figures.

BRIEF DESCRIPTION OF THE DRAWING FIGURES

FIG. 1 shows a schematic view of the left side of a first exemplary embodiment of a new and improved head restraint with a central part in a parking position and two side wings in a neutral position FIG. 2 shows a schematic view of the left side of the head restraint according to FIG. 1, with the central part in a first supporting position and the side wings in a first comfort position FIG. 3 shows a schematic view of the right side of the head restraint according to FIGS. 1-2, with the central part in the parking position and the side wings in the neutral position.

FIG. 4 shows a schematic view of the right side of the head restraint according to FIGS. 1-3, with the central part in the first supporting position and the side wings in the neutral position.

FIG. 5 shows a schematic view of the right side of the head restraint according to FIGS. 1-4, with the central part in a second supporting position and the side wings in the neutral position.

In the various figures, parts which are equivalent in respect of the function thereof are always provided with the same reference numbers, and therefore said parts are generally also only described once.

DETAILED DESCRIPTION

Figure 1:
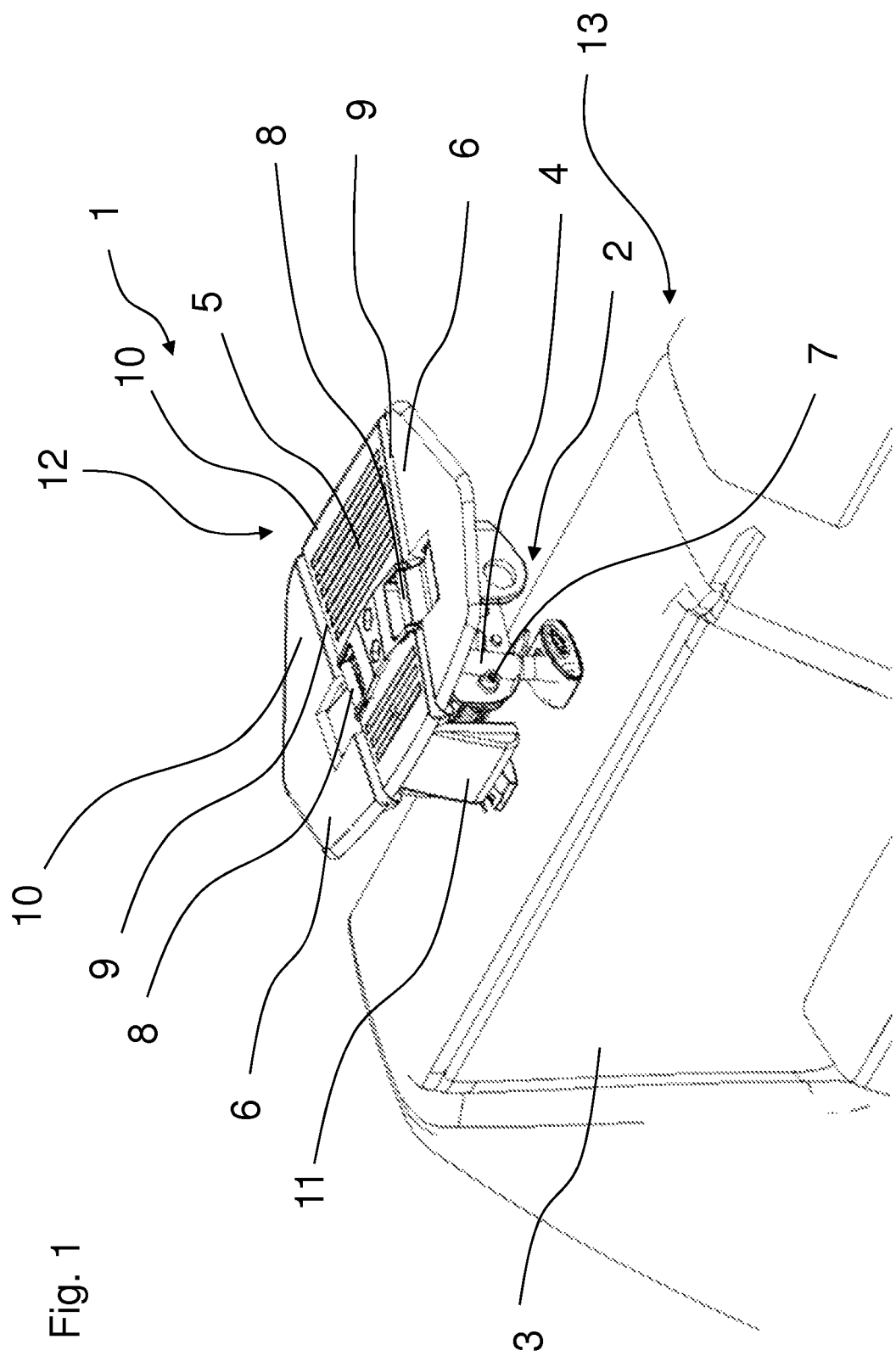

FIG. 1 schematically shows a perspective view of the left side of a first exemplary embodiment of a head restraint 1 in a parking position. The head restraint is fastened by a fastener 2 to a backrest 3 of a vehicle seat. In the first exemplary embodiment shown, the fastener 2 comprises two struts 4 which are arranged parallel to each other and extend into the backrest 3. Furthermore, the head restraint 1 comprises a central part 5 and two side wings 6 arranged thereon. The central part 5 is mounted pivotably about a horizontal pivot axis 7. The horizontal pivot axis 7 is a pillar which extends between the struts 4 of the fastener 2.

Both the central part 5 and the side wings 6 in each case comprise a baseplate 10 on which padding, not shown here, is arrangeable. The baseplate 10 of the central part 5 is a symmetrical trapezoid, and also the baseplates 10 of the side wings 6 are of trapezoidal design, wherein the corners are rounded. The base of the trapezoidal baseplates 10 of the side wings 6 is in each case arranged pivotably on one of the non-parallel edge sides 9 of the baseplate 10 of the central part 5.

The parking position of the head restraint 1 is distinguished in that the front side 12 of the central part 5 encloses an angle of approximately 90° with a perpendicular. The central part 5 is pivoted in the direction of the rear side 13 of the backrest 3 and is substantially parallel to the seat surface of the vehicle seat.

In the parking position of the central part 5, the side wings 6 protrude diametrically therefrom. In this position, the baseplates 10 of the side wings 6 enclose an angle of 180° with the baseplate 10 of the central part 5, which corresponds to the neutral position of the side wings 6 in the exemplary embodiment shown. FIG. 1 therefore shows a head restraint 1, wherein the central part 5 is in the parking position and the side wings 6 are in the neutral position. A view of the right side of this position of the head restraint 1 is additionally provided in FIG. 3. In this positioning of the central part 5 and of the side wings 6, the head restraint 1 is at its flattest and also the vertical extent of the head restraint 1 with respect to the backrest of the vehicle seat is minimal.

The exemplary embodiment shown comprises a further securing means 11 which is arranged vertically on the rear side 13 of the baseplate 10 of the central part 5. The securing means 11 is designed to prevent direct contact of the head against the central part 5, and in particular against the fastener 2, the horizontal pivot axis 7 and the ratchet wheel 14 of the head restraint 1 in the parking position. For example, the region of the securing means 11 can take up an additional position in the direction of the front side 12 of the backrest 3.

Figure 2:
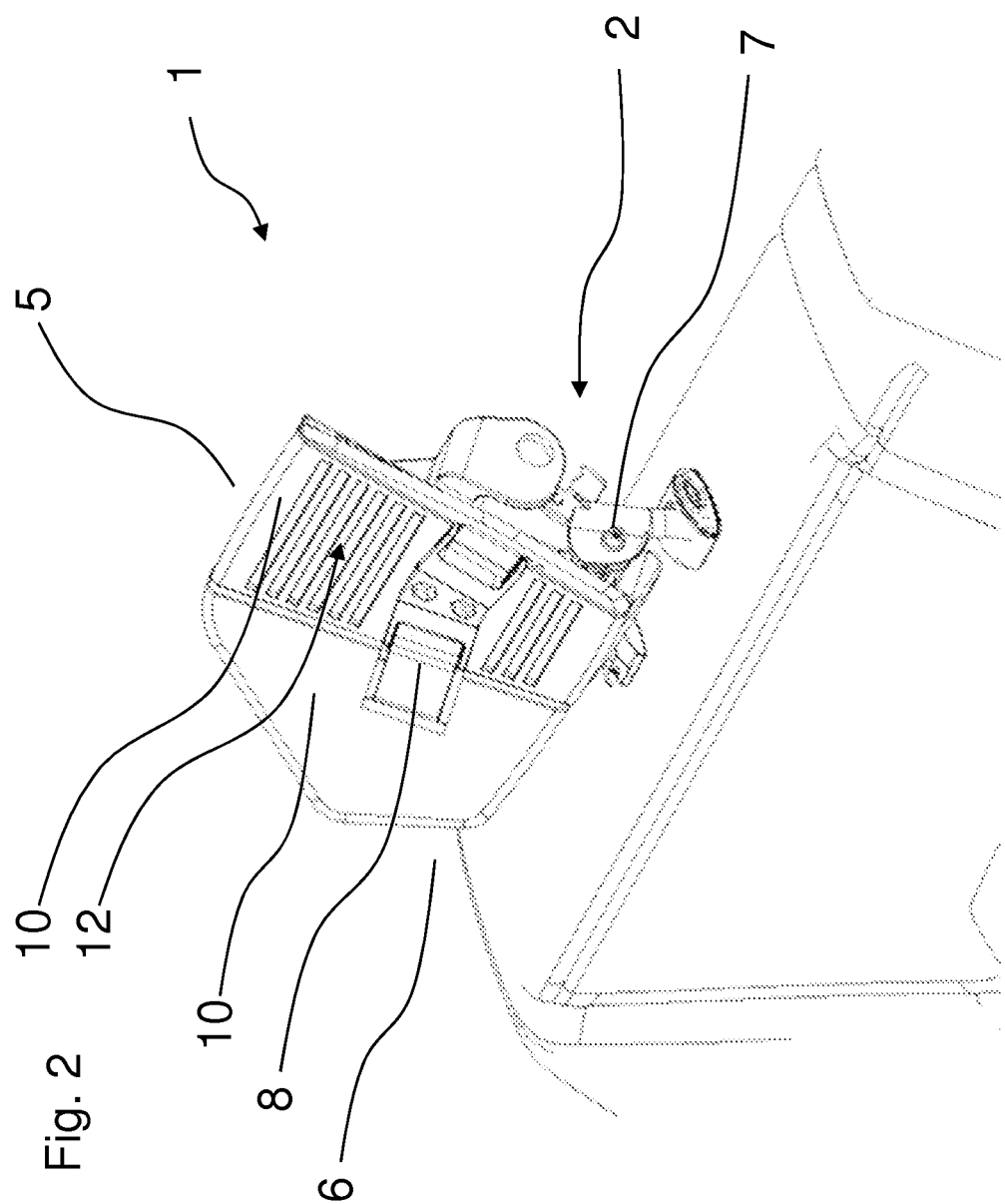

FIG. 2 schematically shows a perspective view of the head restraint 1 according to the exemplary embodiment shown in FIG. 1. The central part 5 of the head restraint 1 is in a first supporting position, and the side wings 6 are in a first comfort position.

In this first comfort position, the baseplates 10 of the side wings 6 in each case enclose an angle of approx. 135° with the baseplate 10 of the central part 5. The central part 5 is pivoted out of the parking position thereof, and the front side 12 of the central part 5 encloses an angle of approximately 30° with the vertical.

FIGS. 3-5 show perspective views of the right side of a head restraint 1 according to FIGS. 1 and 2. The side wings 6 are in each case in the neutral position. FIG. 4 shows the head restraint 1, wherein the central part 5, as shown in FIG. 2, is in a first supporting position. The side wings 6 are in the neutral position. FIG. 5 shows the head restraint 1 with the central part 5 in a second supporting position. In this supporting position, the central part 5 extends substantially vertically as an extension of the backrest 3. The side wings 6 are again in the neutral position.

Figure 7:
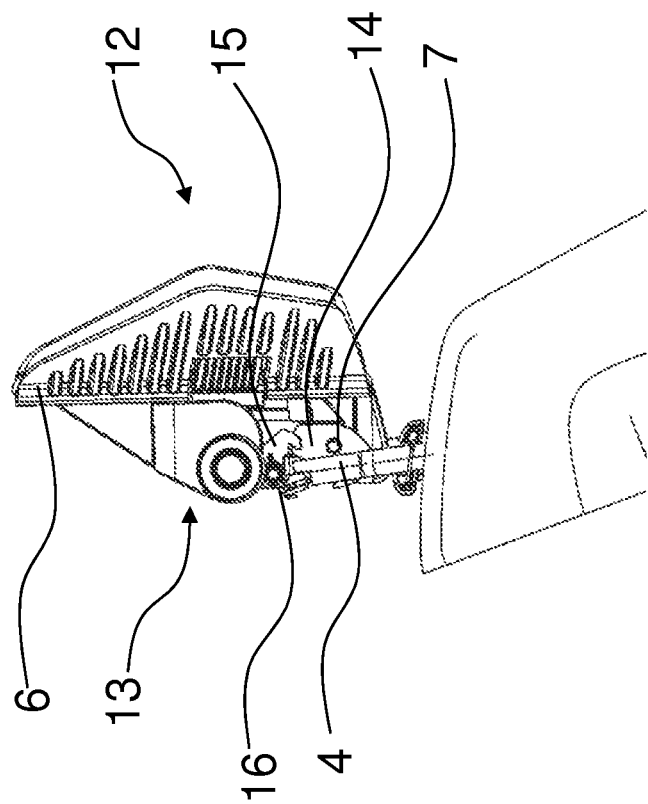
FIG. 7 shows a schematic view of the right side of the head restraint according to FIGS. 1-6, with the central part in the second supporting position and the side wings in the first comfort position.
Figure 6:
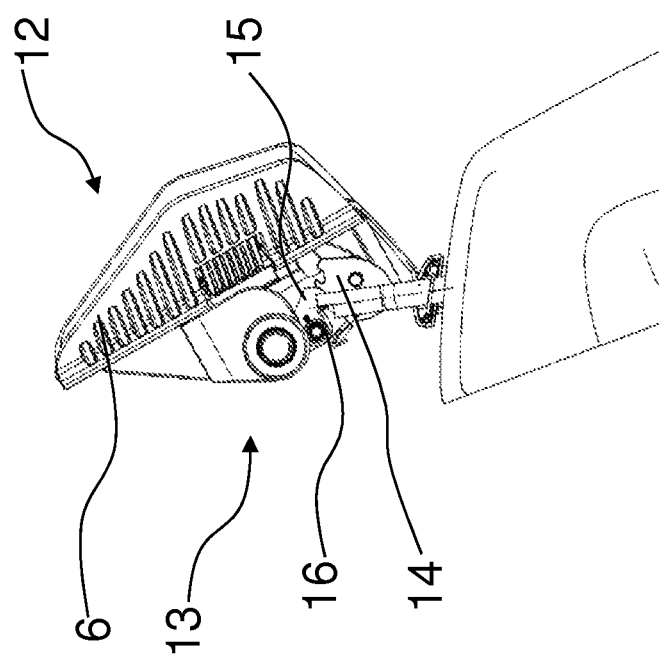
FIG. 6 shows a schematic view of the right side of the head restraint according to FIGS. 1-5, with the central part in the first supporting position and the side wings in the first comfort position.

FIGS. 6 and 7 show perspective views of the right side of a head restraint 1 according to the preceding figures. FIG. 6 shows the head restraint 1 in a position in which the central part 5 is in the first supporting position. The side wings 6 are in the first comfort position. FIG. 7 shows the head restraint 1, wherein the central part 5 is in the second supporting position and the side wings 6 take up the first comfort position. It should be appreciated that further combinations between various supporting positions of the central part 5 and further comfort positions of the side wings 6 are conceivable and are also considered a part of the subject matter of this document.

In addition, a ratchet wheel 14 with a toothing, which ratchet wheel is mounted rotatably about the horizontal pivot axis 7 of the central part 5, can be seen in the side views from FIGS. 3-6. Furthermore, a pawl 15 is arranged on the head restraint 1: the pawl, corresponding to FIGS. 3-5, engaging, depending on the position of the central part 5, in various positions of the toothing of the ratchet wheel 14 and therefore fixing both the ratchet wheel 14 and the central part 5 in the position thereof.

In order to release the pawl 15, a release element 16 is arranged on the head restraint 1. In the exemplary embodiment shown, the release element 16 is a pushbutton which, by actuation, releases the pawl 15 from the toothing with the ratchet wheel 14. The pawl 15 is prestressed against the ratchet wheel 14 by means of a spring (not shown here), and the actuation of the pushbutton acts counter to the spring force, as a result of which the pawl 15 is released from the toothing.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A head restraint, comprising:
    a central part;
    a fastener for fastening said central part to a backrest of a vehicle seat, said fastener including two struts and a horizontal pivot axis extending between said two struts, wherein said two struts are arranged parallel to one another and extend into said backrest; and
    at least one side wing pivotally attached to said central part wherein said central part is displaceable about said horizontal pivot axis between a parking position and at least one supporting position and said at least one side wing is displaceable between a neutral position and at least one comfort position, wherein said central part extends in a plane across a top of said backrest when in said parking position.

2. The head restraint as claimed in claim 1, wherein the head restraint comprises two side wings which are arranged laterally on the central part.

3. The head restraint as claimed in claim 2, wherein the side wings are pivotable about two pivot axes which are arranged mirror-symmetrically with respect to each other.

4. The head restraint as claimed in claim 3, wherein imaginary extensions of the pivot axes which are arranged mirror-symmetrically with respect to each other intersect at a point on a side of the horizontal pivot axis about which the central part is pivotably mounted.

5. The head restraint as claimed in claim 1, wherein the central part is trapezoidal, wherein, in the supporting position, the shorter base of the trapezoid faces a backrest of a vehicle seat.

6. The head restraint as claimed in claim 1, wherein the fastener comprises means for adjusting the height of the head restraint.

7. The head restraint as claimed in claim 1, wherein the fastener has at least one ratchet wheel with an associated pawl for engaging in the ratchet wheel for releasable fixing of the central part , and at least one release element for releasing the pawl from the engagement with the associated ratchet wheel.

8. The head restraint as claimed in claim 7, wherein the pawl fixes the associated ratchet wheel via a spring element.

9. A vehicle seat comprising a backrest and the head restraint as claimed in claim 1.

10. The vehicle seat as claimed in claim 9, wherein the backrest of the vehicle seat can be folded down.

11. The head rest of claim 1, wherein said central part extends in said plane across upper ends of said two struts when in said parking position.

* * * * *